(12) United States Patent
Tian

(10) Patent No.: US 7,801,136 B2
(45) Date of Patent: Sep. 21, 2010

(54) SOURCE ROUTED MULTICAST LSP

(75) Inventor: Albert Jining Tian, Cupertino, CA (US)

(73) Assignee: Ericsson AB, Stockholm (SE)

( * ) Notice: Subject to any disclaimer, the term of this patent is extended or adjusted under 35 U.S.C. 154(b) by 421 days.

(21) Appl. No.: 11/706,125

(22) Filed: Feb. 12, 2007

(65) Prior Publication Data
US 2007/0189291 A1    Aug. 16, 2007

Related U.S. Application Data

(60) Provisional application No. 60/773,867, filed on Feb. 15, 2006.

(51) Int. Cl.
  *H04L 12/28* (2006.01)
  *H04L 12/56* (2006.01)
(52) U.S. Cl. ...................... 370/390; 370/401
(58) Field of Classification Search ............ None
  See application file for complete search history.

(56) References Cited

U.S. PATENT DOCUMENTS

| | | | | |
|---|---|---|---|---|
| 6,694,323 | B2 * | 2/2004 | Bumbulis | 707/101 |
| 2003/0043745 | A1 * | 3/2003 | Kano et al. | 370/238 |
| 2005/0149471 | A1 * | 7/2005 | Lassalle | 707/1 |
| 2005/0169270 | A1 * | 8/2005 | Mutou et al. | 370/390 |
| 2006/0159009 | A1 * | 7/2006 | Kim et al. | 370/216 |
| 2006/0209840 | A1 * | 9/2006 | Paatela et al. | 370/395.7 |

OTHER PUBLICATIONS

E. Rosen, et al., "Multiprotocol Label Switching Architecture", Network Working Group, Standards Track, Jan. 2001, 57 pgs., http://www.ietf.org/rfc/rfc/3031.txt.
L. Anderson, et al., "LDP Specification", Network Working Group, Standards Track, Jan. 2001, 124 pgs., http://www.ietf.org/rfc/rfc/3036.txt.
E. Rosen, et al., "BGP/MPLS VPNs", Network Working Group, Informational, 24 pgs., http://www.ietf.org/rfc/rfc/2547.txt?number=2547, Mar. 1999.
Albert J. Tian, et al., "Source Routed MPLS LSP Using Domain Wide Label", Network Working Group, Internet Draft, Jul. 2004, http://tools.ietf.org/html/draft-tian-mpls-lsp-source-route-01.

* cited by examiner

*Primary Examiner*—Chirag G Shah
*Assistant Examiner*—Minh-Trang Nguyen
(74) *Attorney, Agent, or Firm*—Blakely Sokoloff Taylor & Zafman LLP

(57) ABSTRACT

Source routed multicast LSP is described herein. In one embodiment, when a first node receives a first packet having a label stack including a plurality of labels compatible with MPLS (multi-protocol label switching), in response to a first label on a top of the label stack, the first packet is duplicated into a second packet. In addition, at least two labels are popped from the top of the label stack of the second packet forming a third packet. Thereafter, the first and third packets are processed based on a label on the top of the label stack of the first and third packets respectively. Other methods and apparatuses are also described.

18 Claims, 14 Drawing Sheets

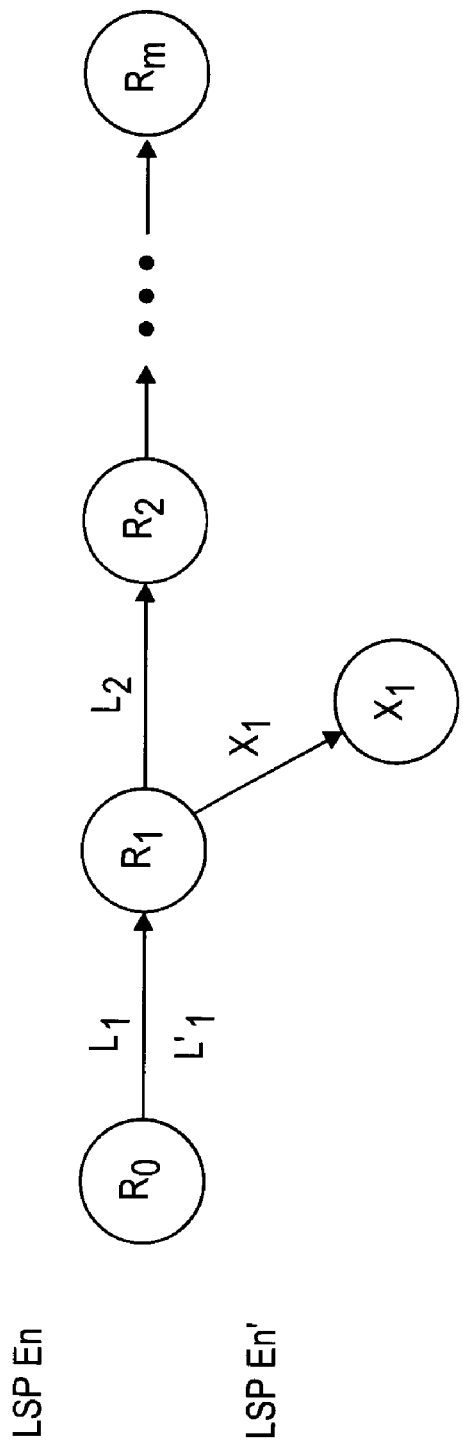

| LSP | LSR A | | | Egress or PHP Operation |
|---|---|---|---|---|
| | IN Label | Operation | OUT Label | |
| LSP B | b | swap | b" | pop |
| Branch LSP B' | b' | swap, copy | b" | pop |
| pop2 LSP B2 | b2 | swap | b2" | pop2 |
| Branch pop2 LSP B2' | b2' | swap, copy | b2" | pop2 |
| pop3 LSP B3 | b3 | swap | b3" | pop3 |
| Branch pop3 LSP B3' | b3' | swap, copy | b3" | pop3 |
| LSP C | c | swap | c" | pop |
| Branch LSP C' | c' | swap, copy | c" | pop |
| pop2 LSP C2 | c2 | swap | c2" | pop2 |
| Branch pop2 LSP C2' | c2' | swap, copy | c2" | pop2 |
| LSP D | d | swap | d" | pop |
| Branch LSP D' | d' | swap, copy | d" | pop |

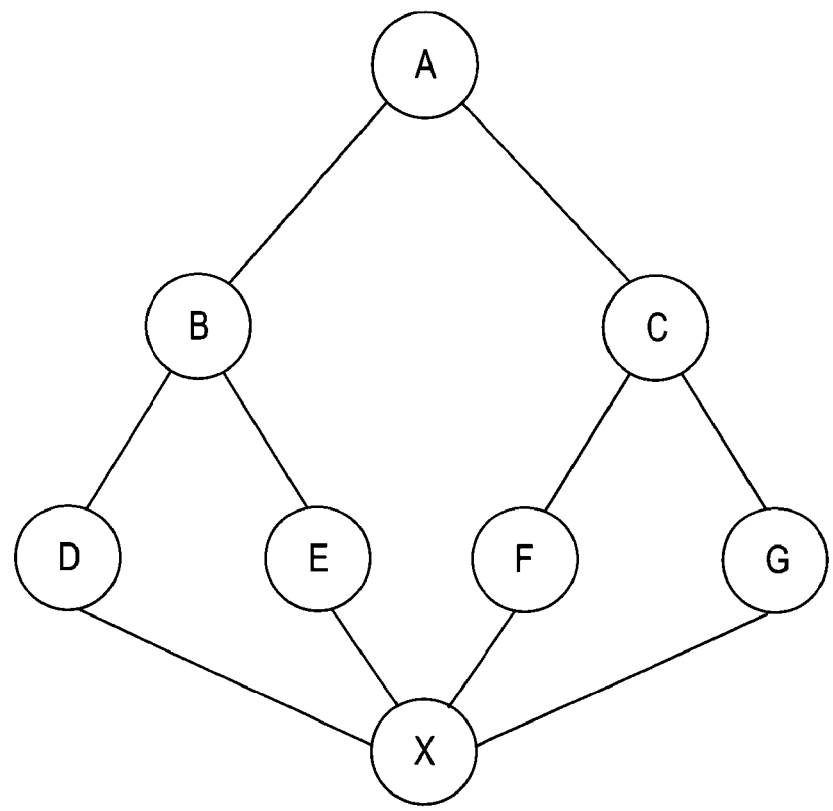
FIG. 7C
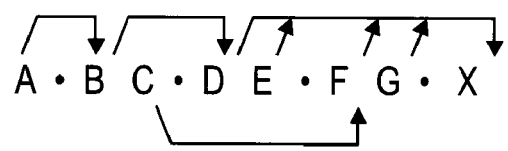
FIG. 7D
A1 • B2 C3 • D4 E3 • F2 G1 • X
FIG. 7E

SOURCE ROUTED MULTICAST LSP

RELATED APPLICATIONS

This application claims the benefit of U.S. Provisional Patent Application No. 60/773,867, filed Feb. 15, 2006, which is incorporated by reference herein in its entirety.

FIELD OF THE INVENTION

The present invention relates generally to network communications. More particularly, this invention relates to source routed multicast LSP (label switch protocol).

BACKGROUND

IP (Internet protocol) multicast builds multicast distribution trees to deliver packets from senders to receivers. The distribution trees are formed by installing multicast forwarding states on routers in a network. Typically, the multicast forwarding states are difficult to aggregate, hence posting a scalability issue for backbone service providers that need support a relatively large number of multicast groups.

Recently, MPLS (multi-protocol label switching) techniques have been greatly utilized in network routing technologies. In an MPLS network, incoming packets are assigned a "label" by a "label edge router (LER)". Packets are forwarded along a label switch path (LSP) where each label switch router (LSR) makes forwarding decisions based solely on the contents of the label. At each hop, the LSR strips off the existing label and applies a new label which tells the next hop how to forward the packet.

A label is a short, fixed length, locally significant identifier which is used to identify a FEC (forwarding equivalence class). The label which is put on a particular packet represents the FEC to which that packet is assigned. FEC is a set of packets which will be forwarded in the same manner (e.g., over the same path with the same forwarding treatment). Typically, packets belonging to the same FEC will follow the same path in the MPLS domain. While assigning a packet to an FEC, the ingress LSR may look at the IP header and also some other information such as the interface on which this packet arrived. The FEC to which a packet is assigned is identified by a label.

Label switch paths (LSPs) are established by network operators for a variety of purposes, such as to guarantee a certain level of performance, to route around network congestion, or to create IP tunnels for network-based virtual private networks. In many ways, LSPs are no different than circuit-switched paths in ATM or Frame Relay networks, except that they are not dependent on a particular Layer 2 technology. An LSP is a specific path traffic path through an MPLS network.

An LSP is a set of LSRs that packets belonging to a certain FEC travel in order to reach their destination. Since MPLS allows hierarchy of labels known as a label stack, it is possible to have different LSPs at different levels of labels for a packet to reach its destination. So more formally, a LSP of a packet with a label of level m is a set of LSRs that a packet p has to travel at level m to reach its destination. Further detailed information regarding MPLS can be found in RFC3031, which is herein incorporated by reference in its entirety.

An LSP is provisioned using label distribution protocols (LDPs) such as RSVP-TE (reserved protocol-traffic engineering) or CR-LDP. Either of these protocols will establish a path through an MPLS network and will reserve necessary resources to meet pre-defined service requirements for the data path.

An LDP is a specification that lets a label switch router (LSR) distribute labels to its LDP peers. When a LSR assigns a label to an FEC, it needs to let its relevant peers know of this label and its meaning and LDP is used for this purpose. Since a set of labels from the ingress LSR to the egress LSR in an MPLS domain defines an LSP and since labels are mapping of network layer routing to the data link layer switched paths, LDP helps in establishing a LSP by using a set of procedures to distribute the labels among the LSR peers.

An LSP can be established that crosses multiple Layer 2 transports such as ATM (asynchronous transport mode), Frame Relay or Ethernet. Thus, one of the true promises of MPLS is the ability to create end-to-end circuits, with specific performance characteristics, across any type of transport medium, eliminating the need for overlay networks or Layer 2 only control mechanisms.

A conventional MPLS label stack is a linear data structure. Currently, there are three major operations defined on the label stack: 1) a "push" operation that adds one or more labels onto the label stack; 2) a "swap" operation that replaces a label on the top of the label stack with a new label; 3) a "pop" operation that removes a label on the top of the label stack and process a next label or the next header depending on if this is the bottom of the label stack. In some cases, operations 1) and 2) may be combined to form a "swap and push" operation that replaces a label on the top of the label stack and then pushes one or more new labels onto the label stack.

Although the above techniques work well with a multicast operation having a linear structure, however, these techniques may not work well for a multicast operation having a non-linear structure. As a result, duplicated packets may be transmitted and network traffic may be increased.

SUMMARY OF THE DESCRIPTION

Source routed multicast LSP is described herein. In one embodiment, when a first node receives a first packet having a label stack including a plurality of labels compatible with MPLS (multi-protocol label switching), in response to a first label on a top of the label stack, the first packet is duplicated into a second packet. In addition, at least two labels are popped from the top of the label stack of the second packet forming a third packet. Thereafter, the first and third packets are processed based on a label on the top of the label stack of the first and third packets respectively.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 4A-4C are diagrams illustrating a process of MPLS labels according to another embodiment of the invention.

FIGS. 5A-5C are diagrams illustrating a process of MPLS labels according to another embodiment of the invention.

FIGS. 7A-7E are diagrams illustrating a process of forming a label stack according to one embodiment of the invention.

DETAILED DESCRIPTION

Source routed multicast LSP is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Embodiments of the invention include a scheme that can encode a multicast distribution tree in data packets using a stack of MPLS compatible labels. The scheme introduces minimum changes to the conventional MPLS forwarding plane or module and allows relatively efficient implementations. In one embodiment, packets can be delivered to multiple destinations in a network following a pre-computed or predetermined multicast distribution tree without having to create multicast forwarding states in the network. As a result, the scalability of the multicast is greatly improved.

Figure 1:
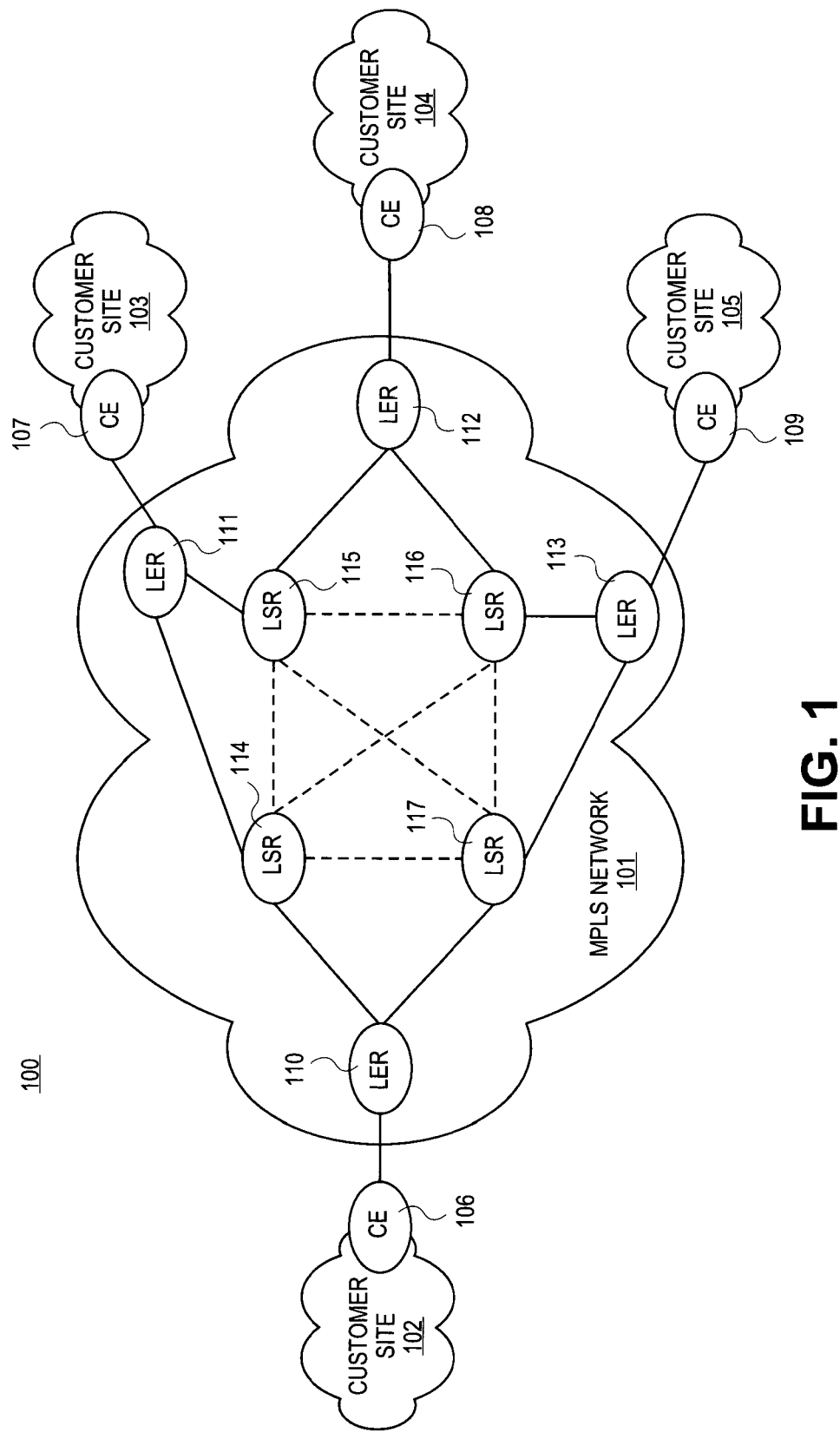
FIG. 1 is a block diagram illustrating an MPLS network configuration which may be used as an embodiment of the invention.

FIG. 1 is a block diagram illustrating a network configuration according to one embodiment of the invention. In one embodiment, referring to FIG. 1, network configuration 100 includes, but is not limited to, a variety of customer or client sites 102-105 coupled to each other via an MPLS network 101. The MPLS network 101 may be implemented on the top of a variety of networks, such as, for example, IP and/or ATM networks. Each of the customer sites 102-105 may include a customer edge (CE) device 106-109 respectively.

The MPLS network 101 includes one or more label switch routers (LSRs) 114-117 to route network traffic within the MPLS network. LSRs 114-117 are also referred to as core routers. Note that four LSRs 114-117 are shown for the purposes of illustration only. It will be appreciated that more or less LSRs may be implemented. In addition, MPLS network 101 may further include one or more label edge routers (LERs) 110-113 coupled to customer sites 102-105 via CEs 106-109 respectively. LERs 110-113 may also be referred to as edge LSRs while LSRs 114-117 may be referred to as core LSRs.

Furthermore, each of the LERs 110-113 and LSRs 114-117 may include a database or table, also referred to as label information base (LIB), for storing label information across the MPLS network 101. In one embodiment, an example of LIB may be implemented similar to one shown in FIG. 5B. A LIB may be implemented as a part of a routing table and/or forwarding table of each node.

Any node in a customer site may reach any one or more of other customer sites through the MPLS network 101 via one or more LERs 110-113 and LSRs 114-116, which form one or more LSPs coupling one or more of the customer sites in the MPLS network 101. For example, customer site 102 may reach one or more of customer sites 103-105 via one or more LSPs formed by one or more of LERs 110-113 and LSRs 114-116.

Typically, in an MPLS network, MPLS labels are used in a point-to-point communication situation (e.g., a unicast situation) using operations set forth above, including pop, swap, push, etc. This is typically a linear node structure, where a label is individually popped, pushed, and/or swapped, one at a time. In a point-to-multipoint situation (e.g., a multicast situation), it is a non-linear node structure. Typically, in a multicast situation, a node has to send out duplicated packets (e.g., at least one for each destination node) to multiple destination nodes via multiple LSPs.

For example, referring to FIG. 1, if a node in customer site 102 attempts to send a packet to customer sites 103-105 through the MPLS network 101, the corresponding CE 106 and/or LER 110 may have to send multiple copies of the packet to the multiple destinations (e.g., customer sites 103-105) via one or more LSRs 114-117. This is due to the fact that any one of the LSRs 114-117 has to operate one label at a time in order to figure out a next hop.

According to one embodiment, new operations of labels are utilized in which multiple labels or multiple operations per label in a label stack can be operated. With the new operations, duplicated packets may be reduced in a multicast situation. In one embodiment, by way of illustration, not by way of limitation, a popN and a copy&pop operations may be utilized. It will be appreciated that other types labels/operations, such as multiple operations on a label, labels on one operation, and/or multiple operations on multiple labels, etc., apparent to one with ordinary skill in the art may also be utilized.

Accordingly, since a tree is non-linear structure in a multicast situation, in order to encode the tree on a label stack, two new operations on the label stack are introduced to support non-sequential processing of the label stack: popN operation and copy&pop operation. In one embodiment, during a popN operation, "n" labels (where n>=1) are removed at the top of the label stack. A next label or next header is processed, for example, depending upon whether the bottom of label stack is reached. The existing pop operation is a special case of popN where n equals to one.

In one embodiment, a copy&pop action may be a secondary label action attached to another primary label operation. During a copy&pop operation, according to one embodiment, the packet is replicated. On the original packet, the primary operation of the top label is executed as normal, for example, resulting the top of the label to be replaced (e.g., similar to swap) with another label that does not have a copy&pop action associated with it. On the duplicate packet, a pop operation is performed and the resulting packet is further processed based on the new top label or next header in the label stack.

Figure 2:
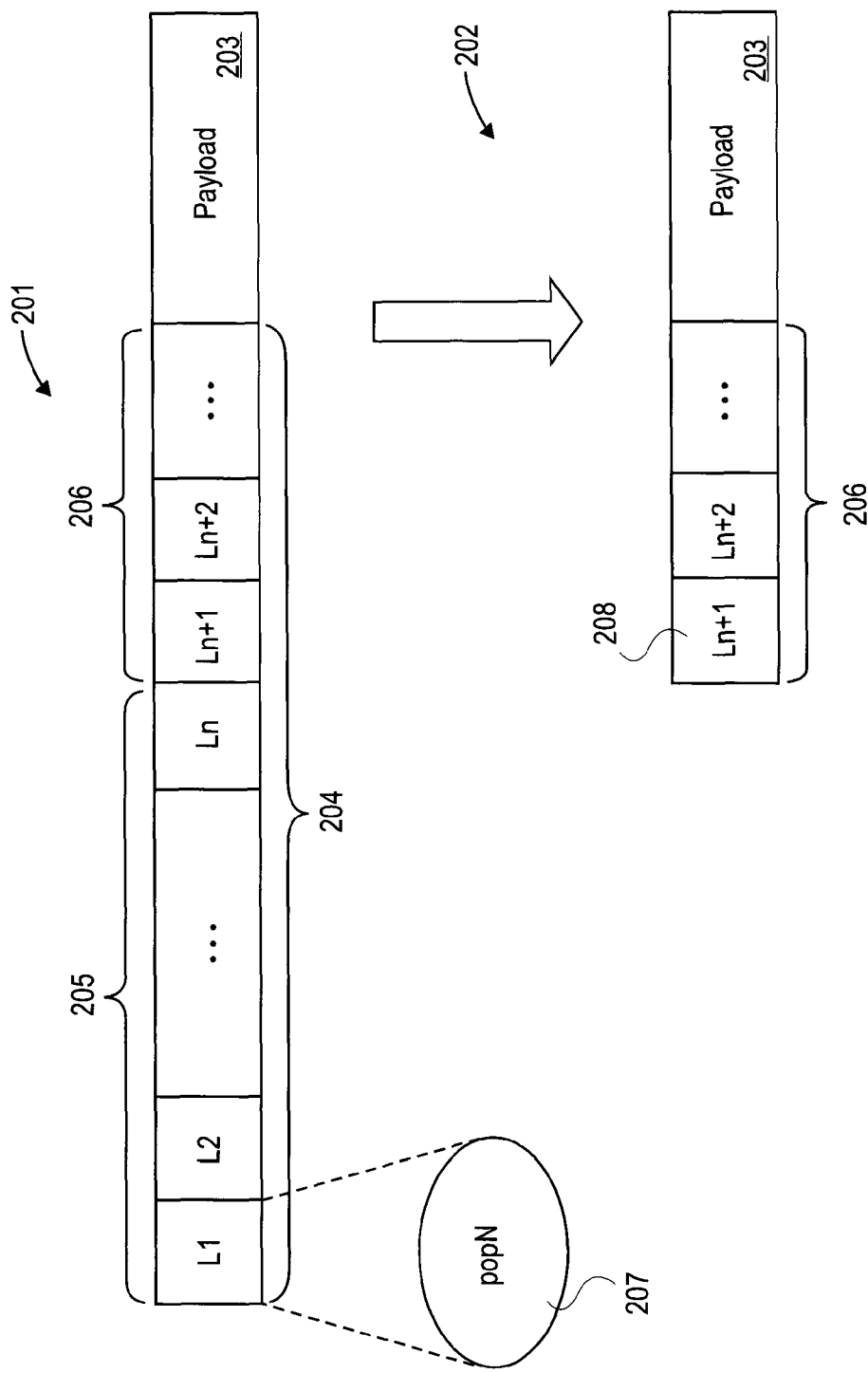
FIG. 2 is a block diagram illustrating an example of operations associated with a popN label, according to one embodiment of the invention.

FIG. 2 is a block diagram illustrating an example of operations associated with a popN label, according to one embodiment of the invention. In this embodiment, packet 201 will be transmitted by a transmitting node and to a receiving node. Packet 202 is a packet after the receiving node processes the packet 201 in view of the label stack of the packet 201. The transmitting and receiving nodes may be any one of nodes in FIG. 1. Typically, the receiving node is a next hop of the transmitting node in an MPLS network similar to MPLS network 101 of FIG. 1.

Referring to FIG. 2, packet 201 includes, but is not limited to, an MPLS label stack 204, also referred to as an MPLS header, and payload 203. MPLS label stack 204 may be embedded within a header of packet 201, for example, between a layer 2 header (e.g., a MAC header) and a layer 3 header (e.g., an IP header). As a result, the MPLS label stack 204 may be processed as a part of layer 2 and/or layer 3 processes.

In this example as shown in FIG. 2, packet 201 is transmitted from a transmitting node to a receiving node. Once the receiving node receives packet 201, the receiving node processes a label 207 on the top of the label stack 204. In this case, the label 207 is a popN label. As a result, "n" numbers of labels (e.g., labels 205) are popped, resulting in packet 202 having the remaining label stack 206. Thereafter, the receiving node determines a next hop based on a label 208 on the top of the remaining label stack, for example, based on a LIB associated with the receiving node. Once the next hop is determined, packet 202 is transmitted to the next hop and processed at the next hope using one or more techniques set forth above and so on.

Figure 3:
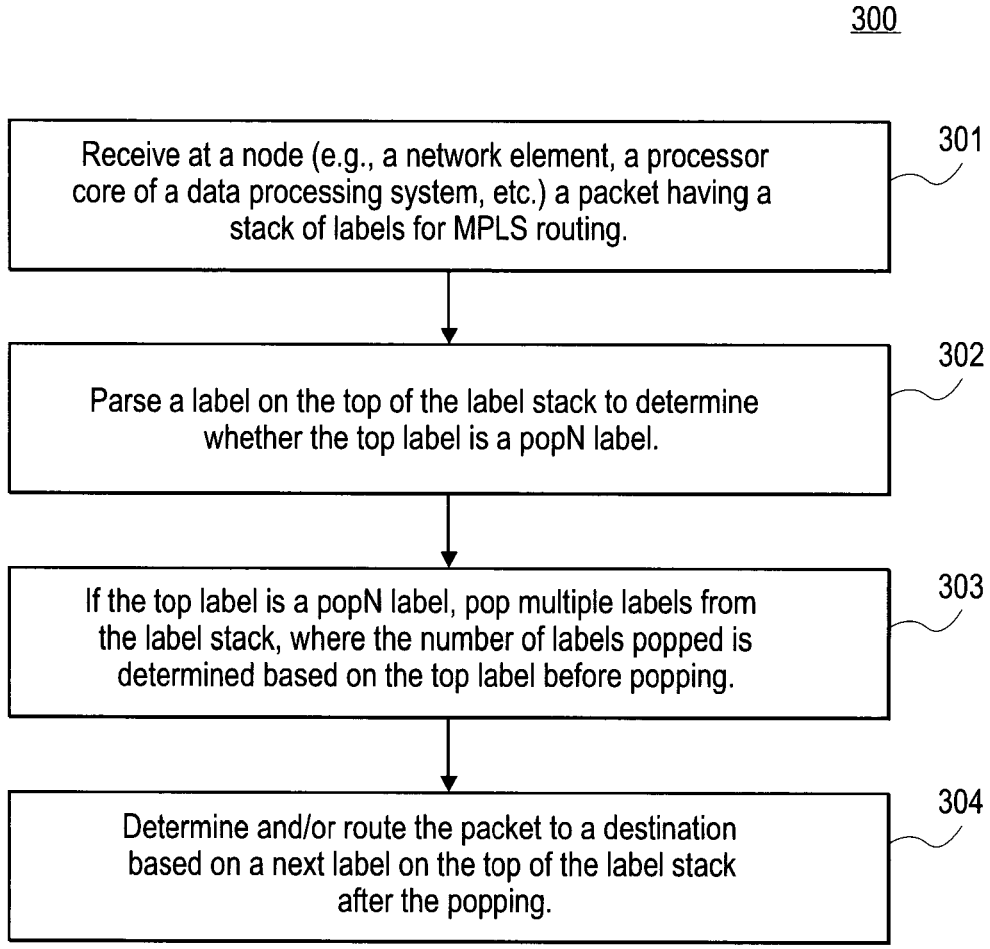
FIG. 3 is a flow diagram illustrating a process for MPLS labels according to one embodiment of the invention.

FIG. 3 is a flow diagram illustrating a process for process a label stack according to one embodiment of the invention. Process 300 may be performed by a processing logic that may comprise hardware (circuitry, dedicated logic, etc.), software (such as is run on a dedicated machine), or a combination of both. For example, process 300 may be processed by any one of the nodes shown in FIG. 1 prior to transmitting a packet to a next hop.

Referring to FIG. 3, at block 301, a node, which may be a network element, a computer system of a cluster, and/or a processor core of a data processing system, etc., receives a packet having a stack of labels (e.g., packet 201 of FIG. 2) for MPLS routing. At block 302, the node parses a label on the top of the label stack (e.g., label 207 of FIG. 2) to determine whether the top label is a popN label. If the top label is a popN label, at block 303, one or more labels are popped from the label stack, where the number of labels popped is determined based on information of the top label prior to popping. For example, a "pop3" label indicates that 3 labels should be popped when the "pop3" label is processed. Thereafter, at block 304, the remaining packet is routed to a next hop based on a next label on the top of the remaining label stack (e.g., label 208 of packet 202 in FIG. 2). The next hope of the next top label may be determined based on a LIB associated with the node. Other operations may also be performed.

According to certain embodiments of the invention, an LSP using one or more popN labels (also referred to as a popN LSP) for an FEC includes a popN operation associated with the FEC, either at an LSP egress or at the penultimate LSR (e.g., if PHP is enabled). A popN may include a swap operation on some or all other LSRs on the LSP path. A popN LSP delivers packets to the LSP egress as normal, where the only difference is that at the egress or the penultimate LSR, "n" labels instead of one are popped from the stack.

A label stack represents a hierarchy of LSPs. A label at level m in the label stack of packet corresponds to an LSP of level m. The label at level m will deliver the packet to the egress of LSP of level m, where the level m label will be popped (if PHP is enabled, the level m label may be popped at the penultimate hop, rather than the egress) and the next forwarding decision is based on the label at level m-1. Effectively, the packet will be forwarded along LSP of level m-1.

For any ingress LSR (referred to as LSR I), according to certain embodiments of the invention, it may have k popN LSPs that has an egress LSR (referred to as LSR E), where n is between 1 and k inclusive. For the purposes of illustration, an LSP En is used to represent popN LSPs with egress E. For example, LSP E2 will have a pop2 operation at the egress or penultimate hop, while LSP E5 will remove 5 labels at the egress or penultimate hop. LSP E is the same as LSP E1, which has a normal pop operation that removes one label from the stack at the LSP egress or penultimate hop.

According to certain embodiments of the invention, a branch popN LSP (or branch LSP for short) is introduced. A branch popN LSP for an FEC is a popN LSP that also includes a copy and pop (copy&pop) action. This is typically associated with an LSP on the first hop of the LSP.

According to one embodiment, a branch LSP creates a branch in packet processing. In addition, a branch popN LSP may include a corresponding popN LSP that does not have a copy&pop action on the first hop. According to one embodiment, when two LSPs share the same path, they share the same labels except on the fist hop. Effectively, the two LSPs merge into one after the first hop. For the purposes of illustration, the notion of En' is utilized to represent the branch popN LSP with egress E, while a normal En is used to represent a popN LSP.

Consider a popN LSP En that traverses LSRs <R0, R1, . . . , Rm>, for example, as shown in FIG. 4A according to certain embodiments of the invention. On the link between R[i-1] and R[i], the label for LSP En is L[i]. The corresponding branch LSP En' traverses the same path <R0, R1, . . . , Rm>. On the link between ingress R0 and the first hop R1, the label L1' for LSP En' has copy&pop action, causing packets to be duplicated on R1, which is the owner of L1', to branch out to node X1. The primary operation for L1' is a swap that would replace L1' with L2, causing LSP En' to merge with LSP En. This swap operation for L1' is similar to the operation for label L1. In addition, label L1' has a copy&pop action associated with it, which label L1 does not have. The other labels L2 through Ln do not have a copy&pop action attached in this example.

Figure 4B:
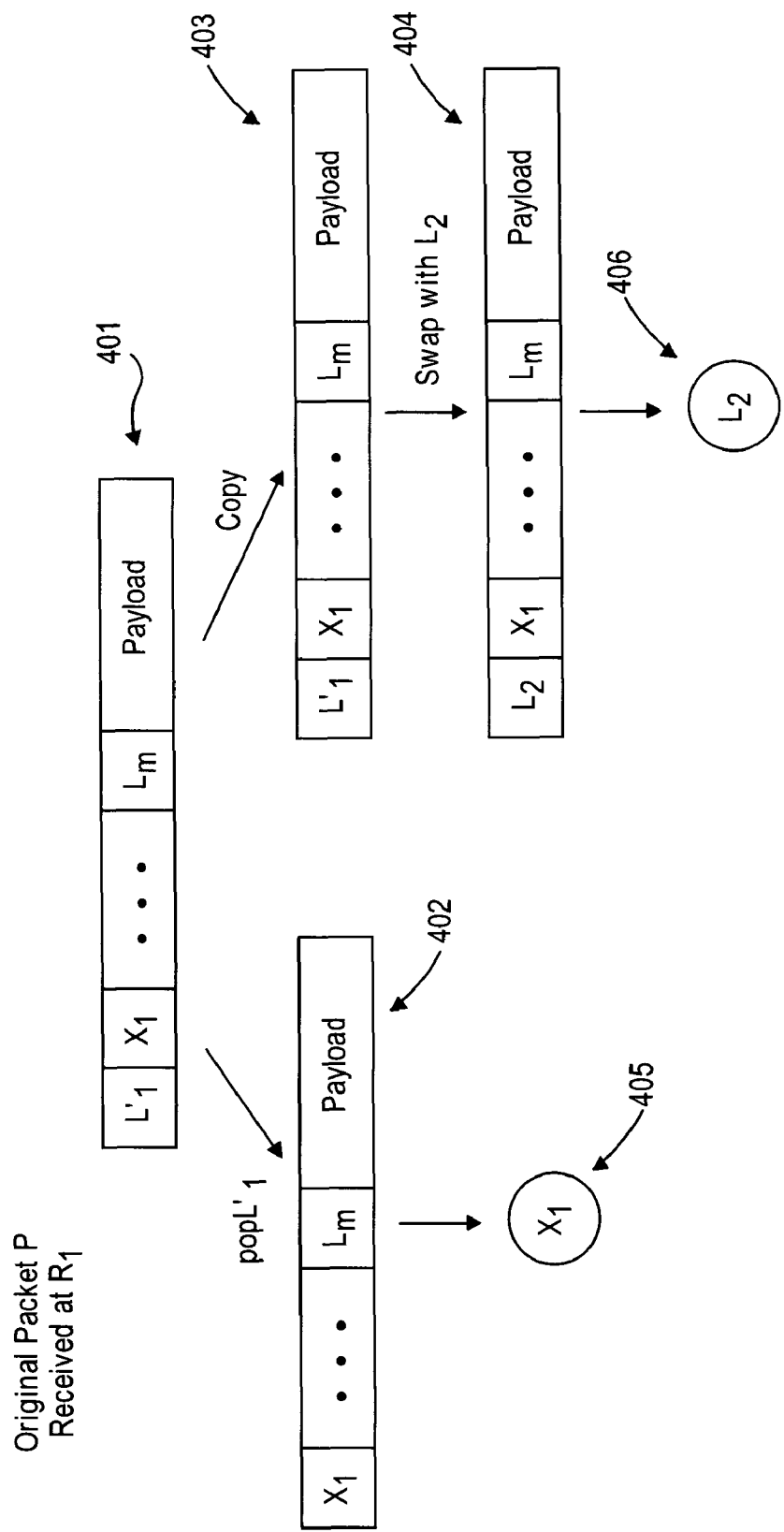
Figure 4C:
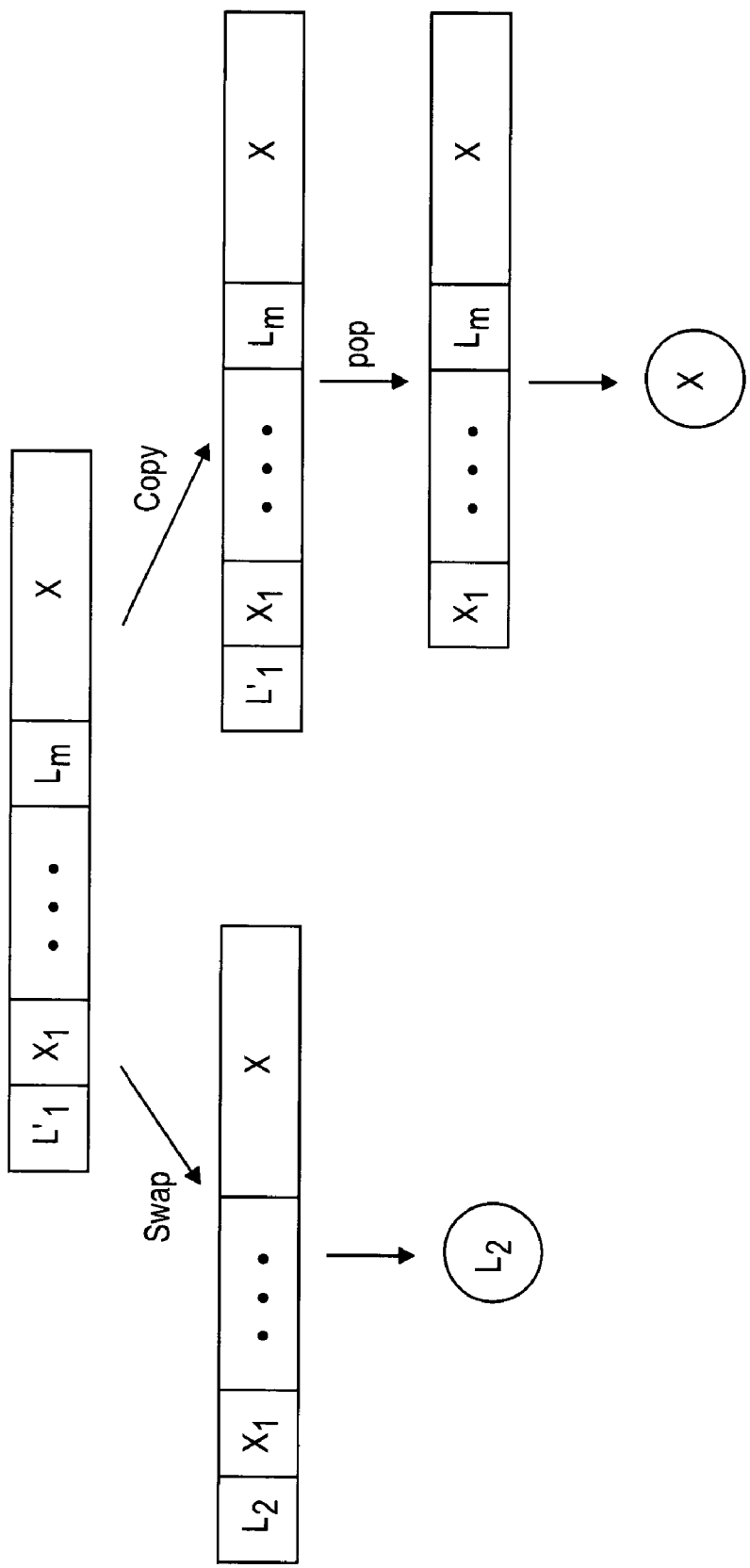

Now consider a packet P with label L1' at level m in its label stack as shown in FIG. 4B for purposes of illustration. Referring to FIG. 4B, according to one embodiment, when packet 401 is delivered to R1 where label L1' is processed, the packet is replicated forming packet 403. On the duplicate packet 403, L1' is swapped to L2 forming packet 404 and the packet 404 is further forwarded along the branch LSP towards Rn (e.g., via node 406). On the original packet, L1' is popped forming packet 402, and the packet 402 is further processed based on label at level m-1, for example, to be delivered to node 405. Note that the sequence of operations in FIG. 4B is shown for purposes of illustration only. It will be appreciated that other sequences, such as those shown in FIG. 4C, may be utilized.

It is possible that the label at level m-q is also a copy label, thus creating yet another branch in packet delivery, according to certain embodiments of the invention. In some cases, the ingress R0 of the branch LSP may perform the replication on R0 itself. In this case, R0 can push L1' onto the stack and send the packet to a forwarding engine for processing. In this case, effectively R0 and R1 collocate on the same LSR.

Consider a branching node B that has k branches leading to R1 . . . Rk according to another embodiment of the invention. In one embodiment, a label stack with k-1 labels on top corresponding to k-1 branch popN LSPs with egress R1 through Rk-1 may be constructed, where one label at the bottom corresponding to a popN LSP with egress Rk. At egress R1 through Rk, the value n for the popN operation may be chosen such that appropriate number of labels is popped and the packet processing continues at the correct place in the label stack.

Figure 5A:
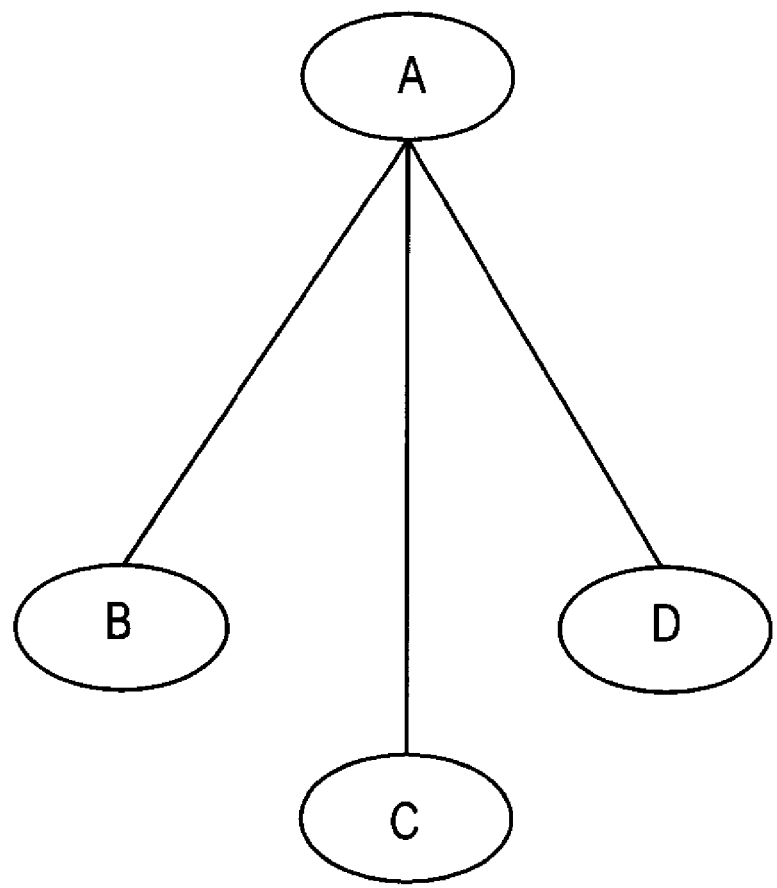

Consider a simple tree as shown in FIG. 5A for example. LSR A needs to replicate a packet and send the packet to B, C, and/or D. Using a branch list for B, C and D, according to an embodiment of the invention, the packet can be delivered to all three nodes B, C, and D. FIG. 5B is an example of a LIB for node A according to one embodiment. Note that LIB 520 is shown for the purposes of illustration only. More or less information may be included in LIB 520. Further, configurations similar to LIB 520 may also be utilized by other nodes.

Referring to FIG. 5B, assuming on LSR A of FIG. 5A, the labels and LSPs are formed using labels for branch LSPs resulting a label stack that can deliver packets correctly to B, C and D. For example, as shown in FIG. 5B according to one embodiment, label b3' is used for a branch pop3 LSP with egress B. Label c2' is used for a branch pop2 LSP with egress C. Label d is used for LSP with egress D.

Figure 5C:
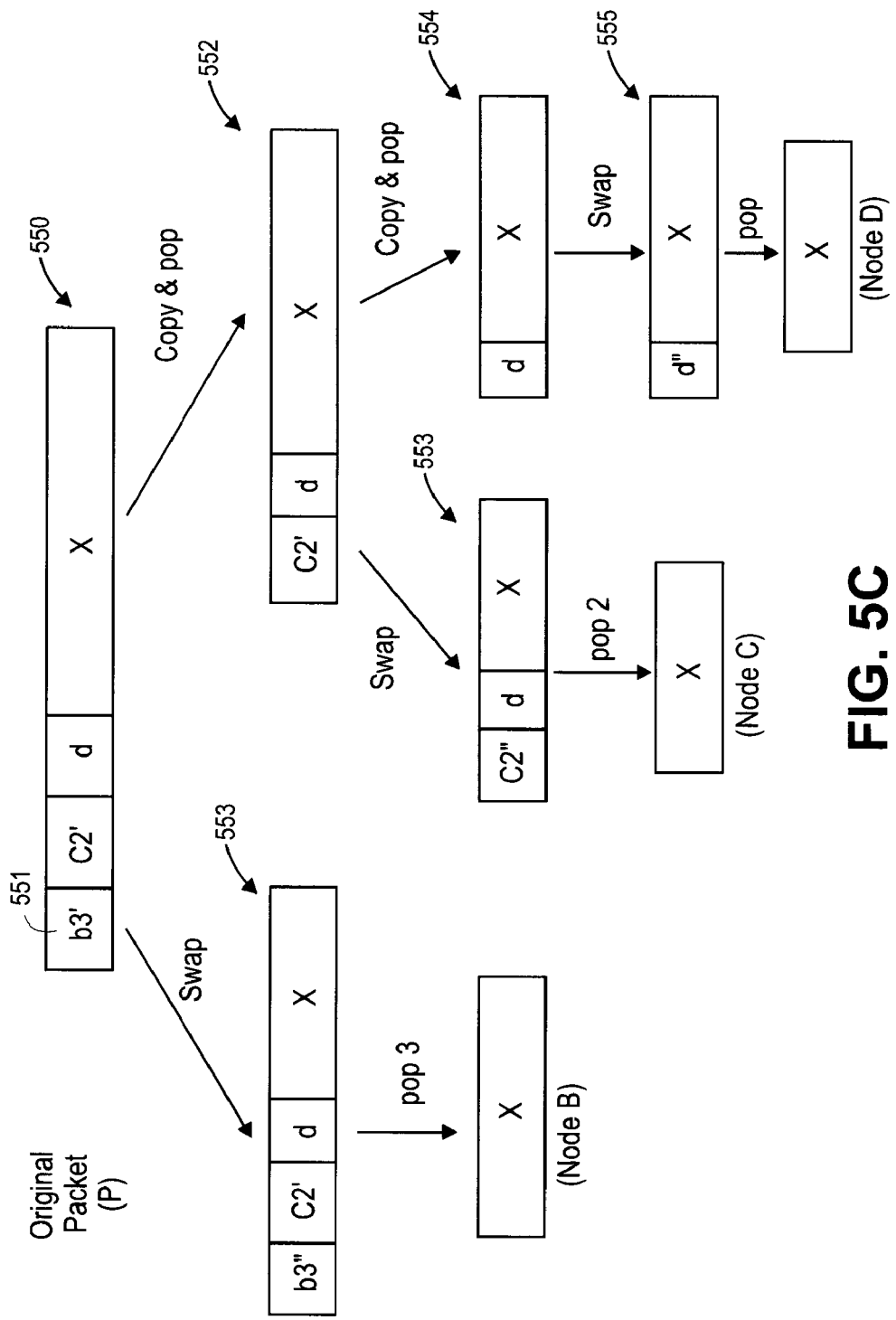

When the packet 550 as shown in FIG. 5C is processed at LSR A, according to one embodiment, the top label b3' 551 will be processed first. Since it is a copy label based on LIB 520 of FIG. 5B, a replicate packet is created from packet 550 and the top label b3' is popped, forming packet 552. On the original packet 500, label b3' is swapped to a non-copy label b3" forming packet 553, and the packet 553 is forwarded along pop3 LSP B3 towards B, where payload X is retrieved via the pop3 operation.

On the duplicate packet 552, label b3' is popped and label c2' becomes the top label. Since the label c2' is also a copy label based on LIB 520, when it is processed, another replicate packet is created and the top label c2' is popped, forming packet 554. On the original packet 552, label c2' is swapped to a non-copy label c2", forming packet 553, and the packet 553 is forwarded along pop2 LSP C2 towards C. On the duplicate 554, top label c2' is popped and label d becomes the top label.

When label d is processed on packet 554, it is swapped to the next label d" forming packet 555 and the packet 555 is forwarded along LSP D towards D, where the payload is retrieved via a pop operation.

When packet 553 arrives on egress B, since the top label b3" has pop3 action, three labels b3", c2' and d will be removed from the label stack and payload x will be processed next. When packet 553 arrives on egress C, since the top label c2" has a pop2 action, two labels c2" and d will be removed from the label stack and payload x will be processed next. When 555 arrives on egress D, since the top label d" has a pop action, the label d" will be removed from the label stack and payload x will be processed next.

Figure 6:
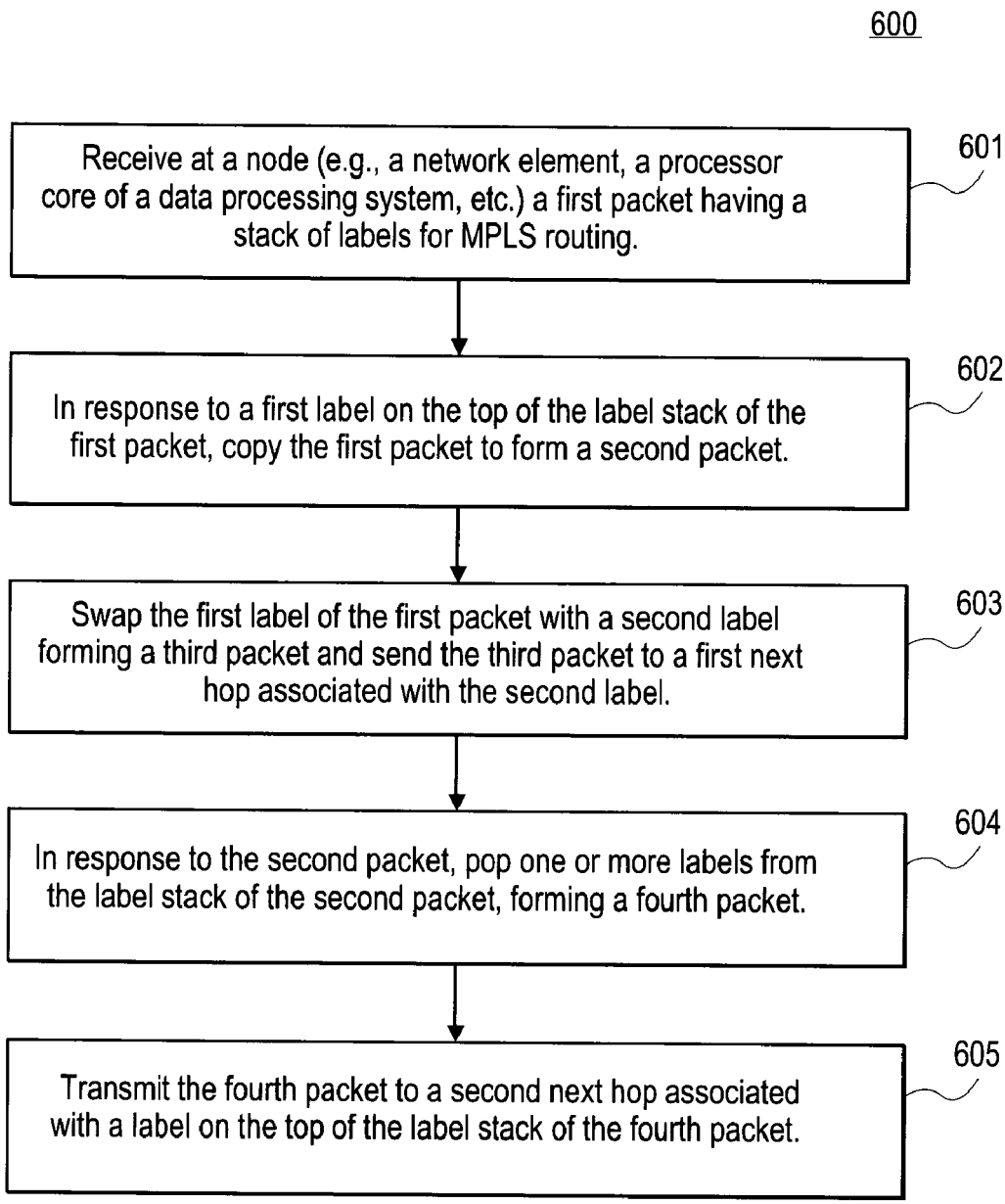
FIG. 6 is a flow diagram illustrating a process of MPLS labels according to a further embodiment of the invention.

FIG. 6 is a flow diagram illustrating a label process according to another embodiment of the invention. Process 600 may be performed by a processing logic that may comprise hardware (circuitry, dedicated logic, etc.), software (such as is run on a dedicated machine), or a combination of both. For example, process 600 may be processed by any one of the nodes shown in FIG. 1 prior to transmitting a packet to a next hop.

Referring to FIGS. 5C and 6, at block 601, a node (e.g., node A) receives a first packet (e.g., packet 550) having a stack of labels compatible with MPLS routing. At block 602, the node parses a first label on the top of the label stack (e.g., label 551). In response to the first label, the first packet is duplicated forming a second packet (e.g., packet 552). At block 603, the first label (e.g., label 551) of the first packet (e.g., packet 550) is swapped with a second label (e.g., label b3"), forming a third packet 553, and the third packet is transmitted to a destination associated with the second label (e.g., node B). Meanwhile, in response to the second packet (e.g., packet 552), at block 604, one or more labels are popped from the label stack of the second packet (e.g., packet 552), forming a fourth packet (e.g., packet 554). At block 605, the fourth packet is transmitted to a destination associated with the remaining top label of the label stack of the fourth packet (e.g., node D). Other operations may also be performed.

According to further embodiments of the invention, a label stack may be used to distribute a packet with a payload along a predetermined distribution tree. When the label stack of the packet is processed at each of the LSRs, the packet is forwarded to the branching nodes, gets replicated there then forwarded further to the next set of branching nodes and so on, until the packet is delivered to all receiving nodes.

As described above, a branch list may be used to encode a branching node. According to certain embodiments, a sequence of branch lists may be used to encode an arbitrary distribution tree. To encode an arbitrary tree, according to one embodiment, the egress of a branch LSP in a branch list may be another branch node. For example, the value n in popN operation for a branch LSP inside a branch list may be chosen such that the packet processing continues at the appropriate branch list corresponding to the branch node at the egress of that branch LSP.

Figure 7A:
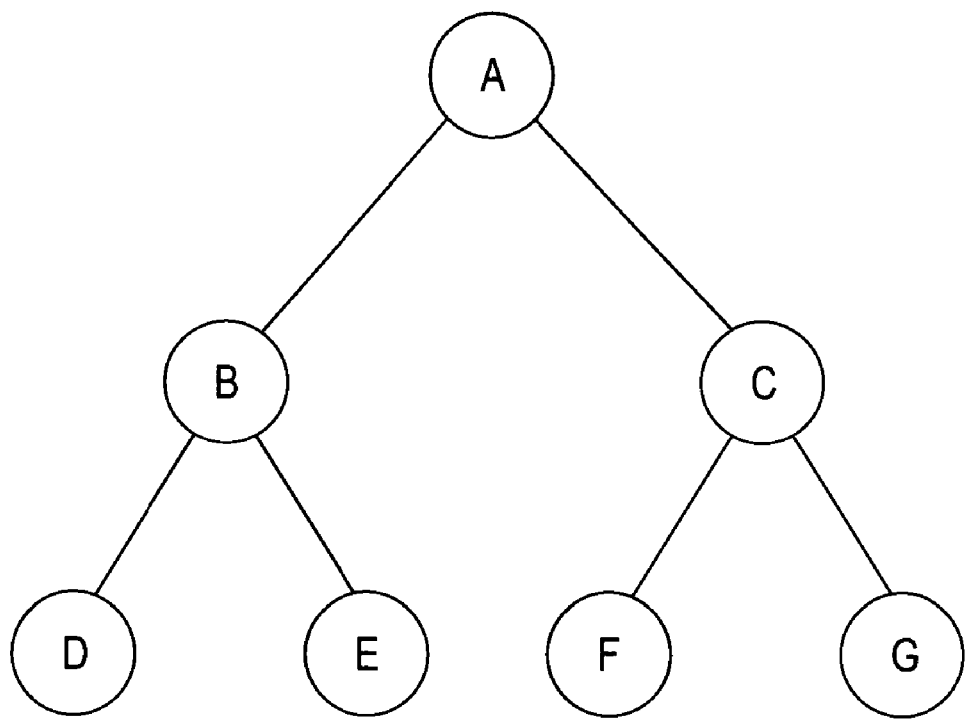
Figure 7B:
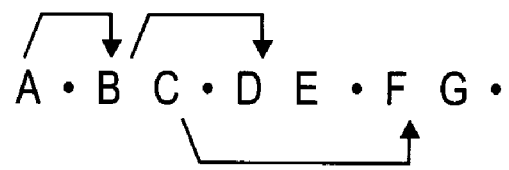

FIGS. 7A-7E are diagrams illustrating a process of encoding an arbitrary tree according to certain embodiments of the invention. Since a label stack is essentially an array, a level order sequential representation (LOSR) is utilized to encode the tree in the label stack. Alternatively, a depth order sequential representation (DOSR) may also be utilized. Consider the tree below shown in FIG. 7A, initially according to one embodiment, substantially all nodes in a tree are configured into an array, from root to bottom, from left to right in a certain level as shown in FIG. 7B. In this representation, all siblings of the same parent may be listed consecutively. For the purposes of illustration, dots are utilized to terminate a list of siblings. Each element in the array represents a node in the tree and each has a pointer pointing to its first child in the array.

When packets arrive at a leaf node, the payload X needs to be processed. So each leaf node should point to the next header X. Accordingly, links are added from all leaf nodes pointing to X, effectively converted into a DAG (directed acyclic graph) as shown in FIG. 7C with payload X appended to the end of the array, as shown in FIG. 7D. Referring to FIG. 7D, a pointer to the child can be encoded as an offset from itself in number of elements. Here the separator "." does no count as an element. For example, B2 means that a first child of B, which is D, is two elements away from B. In this way, the tree can be encoded as the array shown in FIG. 7D, also referred to as an LOSR.

As a result, according to certain embodiments of the invention, labels can be used to encode the array shown in FIG. 7D. Each list of siblings may be converted to a branch list, and each pointer to children encoded as offset of n may be converted to a label corresponding to a branch popN LSP or a popN LSP, as shown in FIG. 7E.

In one embodiment, for an element with offset n that is not the last in the list of siblings, a label corresponding to a branch popN LSP, whose egress is the node corresponding to the element, may be utilized. The label may be allocated by the parent node of the element on the tree. In addition, according to a further embodiment, for an element with offset n that is the last in the list of siblings, a label corresponding to a popN LSP, whose egress is the node corresponding to the element, may be utilized. The label may be allocated by the parent nodes of the element on the tree.

Figure 8:
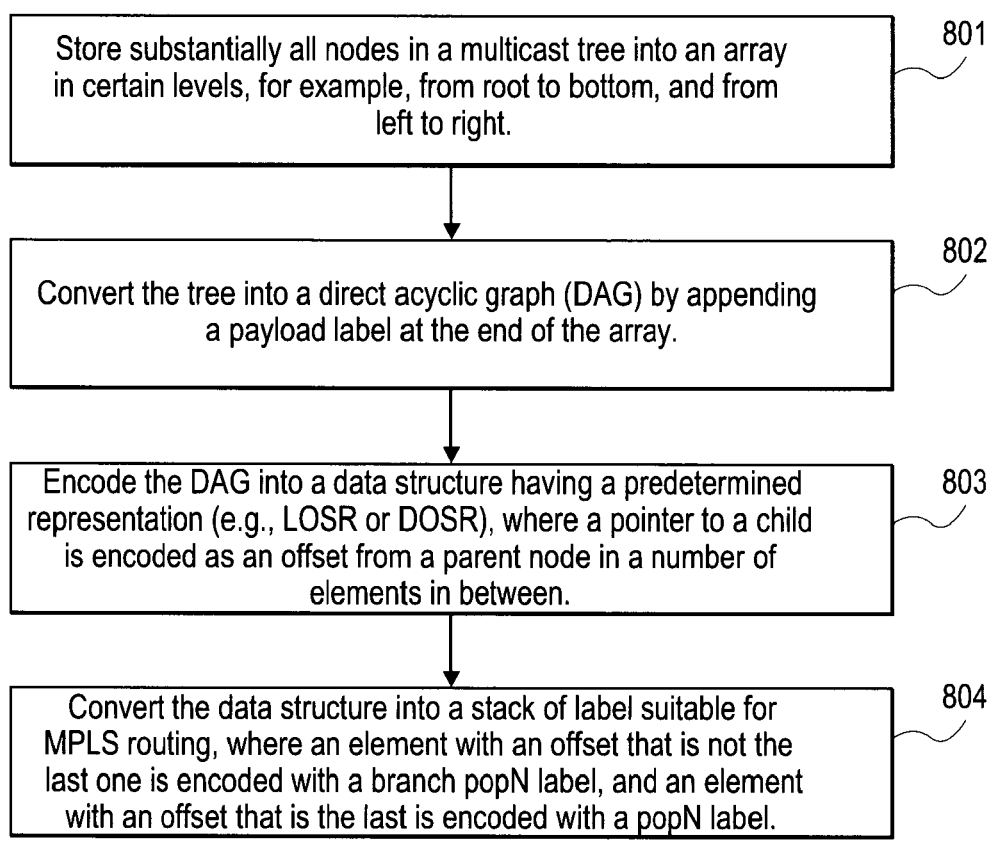
FIG. 8 is a flow diagram illustrating a process for forming a label stack according to one embodiment of the invention.

FIG. 8 is a flow diagram illustrating a process for encoding an arbitrary tree according to one embodiment. Process 800 may be performed by a processing logic that may comprise hardware (circuitry, dedicated logic, etc.), software (such as is run on a dedicated machine), or a combination of both. For example, process 800 may be processed by any one of the nodes shown in FIG. 1.

Referring to FIG. 8, at block 801, substantially all nodes in a multicast tree are stored into an array in one or more levels. In one embodiment, the nodes are stored in a from root to bottom and/or from left to right configuration. At block 802, the tree is converted into a DAG by appending a payload at the end of the array. At block 803, the DAG is converted to, for example, an LOSR, where a pointer to a child is encoded as an offset from a parent node in a number of elements in between. Alternatively, a DOSR may also be used. At block 804, the LOSR is converted into a stack of labels suitable for MPLS routing. According to one embodiment, an element with an offset that is not the last one is encoded with a branch popN label, while an element with an offset that is the last one is encoded with a popN label. The outcome label stack may be processed using one or more techniques set forth above. Other operations may also be performed.

Figure 9:
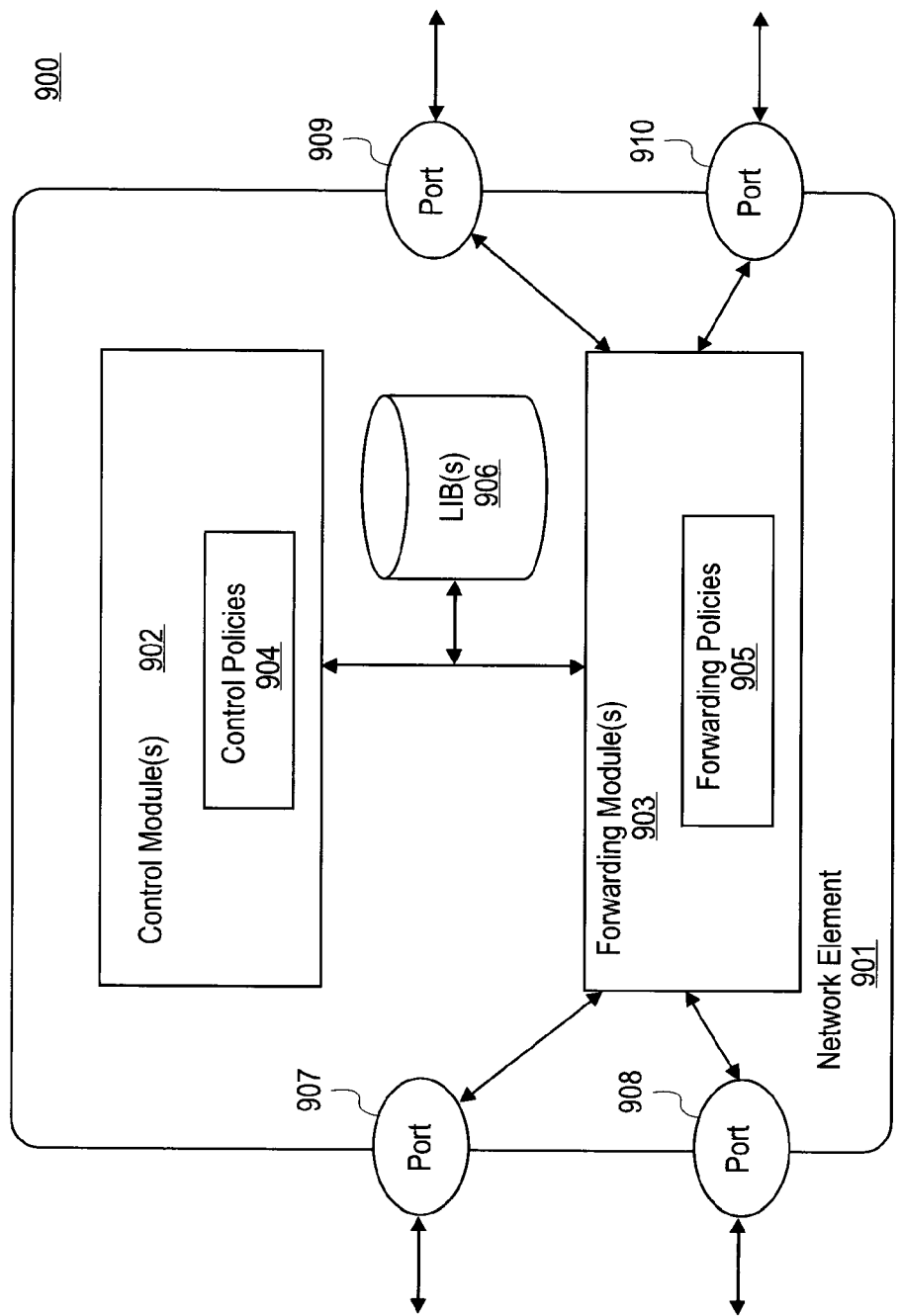
FIG. 9 is a block diagram illustrating a network element which may be used as an embodiment of the invention.

FIG. 9 is a block diagram illustrating an example of a network element capable of processing MPLS packets according to one embodiment of the invention. In this embodiment, network element 901 includes, but not limited to, a control module or modules 902 and a forwarding module or modules 903. In one embodiment, control module 902 includes one or more control policies 904, which may include one or more routing policies.

Forwarding module 903 may also include one or more forwarding policies 905 to control how a packet is being forwarded via one or more ports or interfaces 907-910, which may be implemented within one or more line cards respectively. The forwarding policies 904 may be the same or a subset of the control policies 904. The control and forwarding policies 904-905 may be stored in a machine-readable medium within the respective control module 902 and forwarding module 903. Alternatively, the control and forwarding policies 904-905 may be stored in a machine-readable medium shared by the control module 902 and forwarding module 903.

In addition, network element 901 further includes a LIB or LIBs 906 to store labels suitable for MPLS routing, such as, for example, LIB 520 of FIG. 5B. LIB 906 may be accessible by the control module 902 and/or forwarding module 903. LIB 906 may be implemented as a part of the control policies 904 and/or forwarding policies 905. When packets arrive, forwarding module 903 searches the forwarding policies 905 and/or LIB 906 to make a routing decision for each of the packets. Specifically, the forwarding module 903 examines the information within a packet's header, searches the forwarding policies 905 and/or LIB 906 for a match, and directs the packet from an input interface to an output interface across a switch fabric (not shown), using one or more of the techniques set forth above. Other components may also be included.

Thus, source routed multicast LSP has been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method performed in a first node for multi-casting a packet, the method comprising:
    receiving a first packet having a label stack including a plurality of labels compatible with MPLS (multi-protocol label switching), wherein the label stack is formed in a hierarchical structure based on levels of the label stack, including arranging substantially all nodes involved in a plurality of label switch paths (LSPs) into an array according to the hierarchical structure, from root to bottom and from left to right, and encoding the hierarchical structure into an offset based level order sequential representation (LOSR), wherein a pointer from a parent node to a child node is encoded as an offset representing a number of elements between the parent node and the child node;

duplicating by a processor the first packet into a second packet as a function of contents of a topmost label of the label stack;

forming by the processor a third packet by removing at least two labels from the top of the label stack of the second packet; and transmitting by the processor the first and third packets to different destination nodes as a function of respective contents of the topmost labels of the first and third packets.

2. The method of claim 1, further comprising maintaining within the first node a label information base (LIB) to store information related to at least a portion of the plurality of labels with respect to one or more label switch paths (LSPs) associated with the first node.

3. The method of claim 1, wherein transmitting the first packet comprises:

swapping a first label on the top of the label stack of the first packet with a second label to form a fourth packet; and processing the fourth packet based on the second label of the label stack.

4. The method of claim 3, wherein processing the fourth packet comprises transmitting the fourth packet to a second node associated with the second label, wherein the fourth packet is processed by the second node according to information related to the second label and stored in a LIB of the second node.

5. The method of claim 4, wherein the third packet is transmitted to a third node associated with a label on a top of the label stack of the third packet, wherein the third packet is processed by the third node according to information related to the third label and stored in a LIB of the third node.

6. The method of claim 5, wherein the second and third nodes are different nodes associated with different LSPs (label switch paths).

7. The method of claim 6, wherein the first packet is a multicast packet intended to be transmitted from an origin node to the second and third nodes via the different LSPs, and wherein the origin node transmits a single copy of the first packet to the first node.

8. The method of claim 1, further comprising forming the label stack for a plurality of label switch paths (LSPs) via a plurality of label switch routers (LSRs) according to a hierarchical structure based on levels of the label stack.

9. The method of claim 1, further comprising converting the LOSR into a stack of labels suitable for MPLS routing, wherein an element that is not the last element in the array is encoded with a branch label having a copy and pop operation, and wherein an element that is the last element is encoded as a pop operation for popping multiple labels.

10. A non-transitory computer-readable storage medium for storing instructions, when executed by a machine, cause the machine to perform a method in a first node for multicasting a packet, the method comprising:

receiving a first packet having a label stack including a plurality of labels compatible with MPLS (multi-protocol label switching), wherein the label stack is formed in a hierarchical structure based on levels of the label stack, including arranging substantially all nodes involved in a plurality of label switch paths (LSPs) into an array according to the hierarchical structure, from root to bottom and from left to right, and encoding the hierarchical structure into an offset based level order sequential representation (LOSR), wherein a pointer from a parent node to a child node is encoded as an offset representing a number of elements between the parent node and the child node;

duplicating the first packet into a second packet as a function of contents of a topmost label of the label stack;

forming a third packet by removing at least two labels from the top of the label stack of the second packet; and transmitting the first and third packets to different destination nodes as a function of respective contents of the topmost labels of the first and third packets.

11. The computer readable storage medium of claim 10, wherein the method further comprises maintaining within the first node a label information base (LIB) to store information related to at least a portion of the plurality of labels with respect to one or more label switch paths (LSPs) associated with the first node.

12. The computer readable storage medium of claim 10, wherein transmitting the first packet comprises:

swapping a first label on the top of the label stack of the first packet with a second label to form a fourth packet; and processing the fourth packet based on the second label of the label stack.

13. The computer readable storage medium of claim 12, wherein processing the fourth packet comprises transmitting the fourth packet to a second node associated with the second label, wherein the fourth packet is processed by the second node according to information related to the second label and stored in a LIB of the second node.

14. The computer readable storage medium of claim 13, wherein the third packet is transmitted to a third node associated with a label on a top of the label stack of the third packet, wherein the third packet is processed by the third node according to information related to the third label and stored in a LIB of the third node.

15. The computer readable storage medium of claim 14, wherein the second and third nodes are different nodes associated with different LSPs (label switch paths).

16. The computer readable storage medium of claim 15, wherein the first packet is a multicast packet intended to be transmitted from an origin node to the second and third nodes via the different LSPs, and wherein the origin node transmits a single copy of the first packet to the first node.

17. The computer readable storage medium of claim 10, wherein the method further comprises forming the label stack for a plurality of label switch paths (LSPs) via a plurality of label switch routers (LSRs) according to a hierarchical structure based on levels of the label stack.

18. The computer readable storage medium of claim 17, wherein the method further comprises converting the LOSR into a stack of labels suitable for MPLS routing, wherein an element that is not the last element in the array is encoded with a branch label having a copy and pop operation, and wherein an element that is the last element is encoded as a pop operation for popping multiple labels.

* * * * *

UNITED STATES PATENT AND TRADEMARK OFFICE
CERTIFICATE OF CORRECTION

| | | |
|---|---|---|
| PATENT NO. | : 7,801,136 B2 | Page 1 of 1 |
| APPLICATION NO. | : 11/706125 | |
| DATED | : September 21, 2010 | |
| INVENTOR(S) | : Tian | |

It is certified that error appears in the above-identified patent and that said Letters Patent is hereby corrected as shown below:

In Column 12, Line 21, in Claim 11, delete "computer readable" and insert -- computer-readable --, therefor.

In Column 12, Line 27, in Claim 12, delete "computer readable" and insert -- computer-readable --, therefor.

In Column 12, Line 33, in Claim 13, delete "computer readable" and insert -- computer-readable --, therefor.

In Column 12, Line 39, in Claim 14, delete "computer readable" and insert -- computer-readable --, therefor.

In Column 12, Line 45, in Claim 15, delete "computer readable" and insert -- computer-readable --, therefor.

In Column 12, Line 48, in Claim 16, delete "computer readable" and insert -- computer-readable --, therefor.

In Column 12, Line 53, in Claim 17, delete "computer readable" and insert -- computer-readable --, therefor.

In Column 12, Line 58, in Claim 18, delete "computer readable" and insert -- computer-readable --, therefor.

Signed and Sealed this
First Day of February, 2011

David J. Kappos
*Director of the United States Patent and Trademark Office*